No. 657,888. Patented Sept. 11, 1900.
J. F. SCULLEN.
JOINT FOR RAILWAY RAILS.
(Application filed Feb. 26, 1900.)
(No Model.)

Witnesses:
G. S. Noble
D. M. Sweeney

Inventor,
James F. Scullen
By H. C. Hunsberger
Att'y.

UNITED STATES PATENT OFFICE.

JAMES F. SCULLEN, OF CHICAGO, ILLINOIS.

JOINT FOR RAILWAY-RAILS.

SPECIFICATION forming part of Letters Patent No. 657,888, dated September 11, 1900.

Application filed February 26, 1900. Serial No. 6,634. (No model.)

*To all whom it may concern:*

Be it known that I, JAMES F. SCULLEN, a citizen of the United States, residing at Chicago, county of Cook, and State of Illinois, have invented a new and useful Improvement in Joints for Railway-Rails, of which the following is a specification.

The invention has for its object the joining of the abutting ends of railway-rails, to provide a smooth and even surface for the tread of the car-wheel, and to avoid the jarring, or what is known as the "pounding," of the wheels in passing over the joints, which are usually affected more or less by expansion and contraction due to the extremes of heat and cold. My invention provides a joint much like the letter Y, with the forks of the upper portion making a more obtuse angle. This joint presents to the tread of the wheel in passing over it a sufficient area of smooth surface to carry it over to avoid the jar that is usually caused by the transverse joint.

My invention is illustrated in the accompanying drawings, in which—

Figure 1:
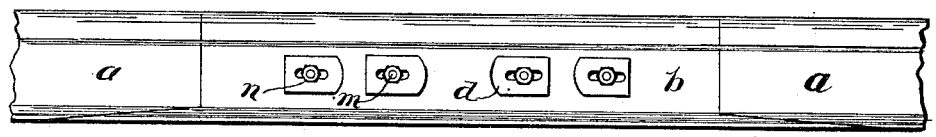
Figure 2:
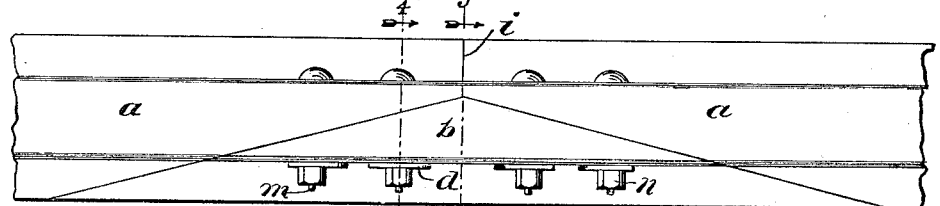
Figure 3:
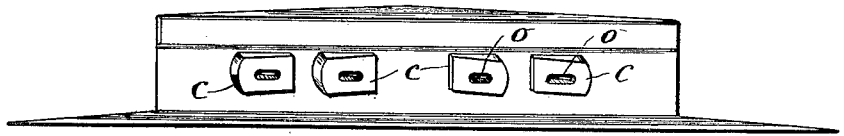
Figure 4:
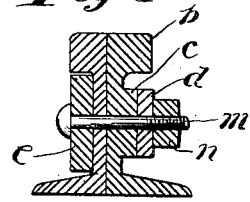
Figure 5:
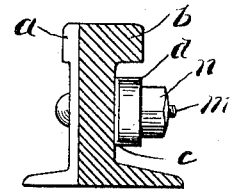
Figure 6:
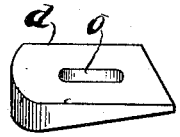

Figure 1 is a side elevation of the railway-rail where the abutting ends are joined. Fig. 2 is a plan or top view of the rail and joint. Fig. 3 is a side view of the piece forming the joint. Fig. 4 is a transverse section on line 4 4, Fig. 2. Fig. 5 is a transverse section on line 5 5, Fig. 2. Fig. 6 is a perspective view of the wedge-shaped washer used in tightening the joint.

In the illustration, $a\ a$ represent two abutting railway-rails composing the track.

$b$ is a triangular portion of a rail.

$c\ c$ are wedge-shaped collars raised on the side of the shank of the triangular portion of the rail.

$d$ is a wedge-shaped washer.

$e$ is the fish-plate.

$m$ is one of the bolts used in fastening the rails together.

$n$ is a nut on the end of the bolt.

$o$ is a slot through washer $d$, collar $c$, and rails.

The rails $a\ a$ are beveled on one side at the ends and laid end to end in the usual manner. On one side the ends are flush with each other; but on the opposite side the beveled sides show a triangular or half-diamond shaped open space. The abutting ends have a narrow transverse joint $i$. The triangular open space at the joint $i$ is closed by means of a short piece of rail $b$, beveled on one side from its center to the ends to fit into the triangular opening at the joint $i$. To make the rail uniform in width and surface the joint then appears in the form of the letter Y. On the outer side of the short rail $b$ on the shank are raised several wedge-shaped collars $c$, through which, including the rails, is a slot $o$. Through this slot is a bolt $m$, having a nut $n$ and carrying between the collar $c$ and nut $n$ a wedge-shaped washer $d$. The washer $d$, also provided with a slot $o$, is laid on the collar $c$, so that the large end of one is in contact with the narrow or thin end of the other to wedge together to tighten the joint when a movement of the rails occurs by expansion or contraction, or it may be tightened by the track-walker with a hammer when loosened by any cause. The slots $o$ allow sufficient play for the bolt to provide for the longitudinal movement of the rails when expanding or contracting. The fish-plate $e$ is placed on the flush side of the joint and is held by the bolts $m$ or by any other ordinary fastening, as may be desired; but ordinarily the bolts $m$ should pass through the fish-plate, the rails $a$ and $b$, and be acted upon by the wedge-washer $d$. It will be observed that this method of joining the rails presents an area of smooth even surface for the tread of the car-wheel to carry it over any part of the joint without a perceptible jar.

I do not limit my invention to the exact form of the Y-joint shown here. The angle may be deviated from—made more or less obtuse—without affecting the principle involved.

Having thus described my invention, what I claim as new, and desire to protect by Letters Patent, is—

In a joint for railway-rails, rails having one side at each end beveled, a triangular rail portion adapted to fit into the angular open space formed by the two abutting beveled ends of said rails forming a Y-joint, a wedge-shaped collar raised on the outer side of the shank of said triangular rail portion, a slot through said collar and rails, a bolt through said slot and rails, a nut on said bolt, a wedge-shaped washer provided with a slot on said bolt between said nut and collar substantially as described.

In testimony whereof I affix my signature in presence of two witnesses.

JAMES F. SCULLEN.

Witnesses:
JERRY J. SULLIVAN,
H. C. HUNSBERGER.